United States Patent [19]
Kawahara et al.

[11] Patent Number: 5,548,331
[45] Date of Patent: Aug. 20, 1996

[54] CLAMPING CIRCUIT

[75] Inventors: Norihiro Kawahara; Yasuyuki Tanaka, both of Tokyo, Japan

[73] Assignee: Canon Kabushiki Kaisha, Tokyo, Japan

[21] Appl. No.: 110,428

[22] Filed: Aug. 23, 1993

[30]     Foreign Application Priority Data

Aug. 28, 1992  [JP]  Japan ................................. 4-253985
Aug. 31, 1992  [JP]  Japan ................................. 4-255674

[51] Int. Cl.⁶ ............................. H04N 9/64; H04N 5/21
[52] U.S. Cl. ...................... 348/243; 348/607; 348/186; 348/533
[58] Field of Search ...................... 348/207, 257, 348/259, 691, 692, 272, 227, 186, 607, 533, 689, 694, 695, 696, 697, 177, 687; 358/500; H04N 9/64, 5/21

[56]         References Cited

U.S. PATENT DOCUMENTS 4,388,640  6/1983  Rhodes ................................. 348/272
4,488,168  12/1984  Mino ................................. 348/186
4,930,004  5/1990  Yamamoto et al. ................. 348/691
5,198,890  3/1993  Suga ................................. 348/227

*Primary Examiner*—Michael T. Razavi
*Assistant Examiner*—Andrew B. Christensen
*Attorney, Agent, or Firm*—Robin, Blecker, Daley & Driscoll

[57]           ABSTRACT

A clamping circuit for applying clamping to a signal having a plurality of components includes a frequency divider which frequency-divides a main clock signal of the clamping circuit by an even number when the plurality of components of the signal are odd in number and another frequency divider which frequency-divides the main clock signal of the clamping circuit by an odd number when the plurality of components of the signal are even in number. Manual adjustment of an optical black correction is provided which permits verification of an accurate optical black correction by monitoring color difference vectors on a vector scope.

9 Claims, 15 Drawing Sheets

CLAMPING CIRCUIT

BACKGROUND OF THE INVENTION

1. Field of the Invention

This invention relates to a signal processing circuit and more particularly to a clamping circuit for colors or luminance.

2. Description of the Related Art

The conventional color or luminance clamping circuit has been arranged to integrate data for a predetermined period (one field period, for example), to obtain a mean value of the data by dividing the integrated data value by the number of the data, to use the mean value as a clamping value, and to apply clamping to an original signal by subtracting the clamping value from the original signal.

One example of the conventional arrangement is described as follows with reference to FIGS. 1 to 3, which relate to the conventional color clamping circuit: FIG. 1 is a circuit diagram showing the conventional color clamping circuit. FIG. 2 is a time chart showing a phase relation obtained among signals shown in FIG. 1. FIG. 3 is a circuit diagram showing the internal arrangement of each of integrators used for the conventional color clamping circuit. In computing the clamping value, the conventional color clamping circuit individually accumulates and adds up each of continuous red (R) data, green (G) data and blue (B) data by latching them respectively in accordance with clock signals CLK1 to CLK3 as shown in FIG. 1. Further, as shown in FIG. 3, the conventional color clamping circuit is provided with adders for each of the data of three color components, including the R, G and B components.

The conventional luminance clamping circuit is described by way of example as follows, with reference to FIGS. 4 to 6: FIG. 4 is a circuit diagram showing one example of the conventional luminance clamping circuit. FIG. 5 is a circuit diagram showing another example of the conventional luminance clamping circuit. FIG. 6 is a time chart showing a phase relation obtained among signals shown in FIGS. 4 and 5. The conventional luminance clamping circuit is arranged to compute the clamping value in the following manner: data of different components are accumulated and added by lines, as shown in FIG. 6. For example, the data of Wr and Gb components are accumulated and added for one line and the data of Gr and Wb components are accumulated and added for another line. The accumulating and adding action is performed by using a main clock signal CLK in the case of FIG. 4 and by using a clock signal CLK2 obtained by frequency-dividing the main clock signal CLK by two in the case of FIG. 5.

The example of the conventional color clamping circuit shown in FIG. 1 operates as follows: in accumulating and adding, for example, the R component, an R component part is assumed to appear in a signal SIG at the rise of a main clock signal MCLK. Then, at the same time, another R component part appears in another input of an adder at the rise of the clock signal CLK1. These R component parts are added up at the adder. This addition must be completed before the main clock signal MCLK comes to rise again. This is because the R, G and B components are continuous data. The G component would appear in the signal SIG during a next period of the clock signal and the R and G components would be added together. Therefore, a different color component tends to be mixed in the data accumulated and added by each integrator. Further, depending on the arrangement of the device, the adding process might not be completed within one clock period. In such a case, it is hardly possible to obtain an accurate clamping value.

The luminance clamping circuit also has presented a problem similar to the problem presented by the color clamping circuit. It is necessary also for a luminance clamping circuit to use a high-frequency clock signal for latching continuous data in accordance with a main clock signal (CLK in FIG. 6). Therefore, depending on the arrangement of the device, an adding process might not be completed within one clock period and thus might fail to give an accurate clamping value. To solve this problem, it has been contrived to use a clock signal obtained by dividing the main clock signal of the system by two, considering the speed of the clock signal, as shown in FIG. 5. In this case, however, the signal components are integrated by latching them by means of a delay device disposed before an adder to integrate only the Wr component for a line n and only the Gr component for a next line n+1 as shown in FIG. 6. This arrangement also has failed to give an accurate luminance clamping value.

Further, the conventional clamping circuit has presented another problem in that the amount of hardware has been increased by the use of three adders which are individually arranged as shown in FIG. 3 to integrate respectively the data of R, G and B color components.

SUMMARY OF THE INVENTION

This invention is directed to the solution of the above-stated problems of the prior art. It is, therefore, an object of this invention to provide a clamping circuit which is arranged to use a frequency-divided clock signal for an integrator to avoid any faulty action of an adder included in the integrator for correctly clamping a signal, and also a clamping circuit which is arranged to use a single adder in a time sharing manner for a plurality of signal components, so that the amount of hardware can be greatly reduced.

To attain this object, a clamping circuit arranged as an embodiment of this invention to apply clamping to a signal having a plurality of components comprises a frequency divider arranged to frequency-divide a main clock signal of the clamping circuit by an even number when the plurality of components of the signal are odd in number and another frequency divider arranged to frequency-divide the main clock signal of the clamping circuit by an odd number when the plurality of components of the signal are even in number.

Further, in a clamping circuit which is arranged as another embodiment of this invention to apply clamping to a signal having a plurality of components, a single adder is arranged to receive as an input signal the output of a selector which selects the plurality of components of the signal and to individually integrate the plurality of components of the signal in a time sharing manner.

The clamping circuit according to this invention is arranged to integrate, as in continuous data, a signal having a plurality of components by using clock signals obtained by frequency-dividing the main clock signal of the system of the clamping circuit. Further, the arrangement to use a frequency divider which frequency-divides the main clock signal by an even number when the plurality of components of the signal are odd in number and another frequency divider which frequency-divides the main clock signal by an odd number when the plurality of components of the signal is even in number enables the embodiment to uniformly integrate a plurality of different components of the signal in a case where data is to be integrated for a predetermined period of time.

Further, with the embodiment provided with the adder which is arranged to use the output of the selector, one of the plurality of components of the signal is selected and, after the selection, an integrating action is carried out by adding an output of a clock arrangement to the signal component selected. This arrangement enables the embodiment to integrate the plurality of components of the signal by means of a single adder for all the different components of the signal.

The above and other objects and features of this invention will become apparent from the following detailed description of embodiments thereof taken in conjunction with the accompanying drawings.

DETAILED DESCRIPTION OF THE PREFERRED EMBODIMENTS

Figure 1:
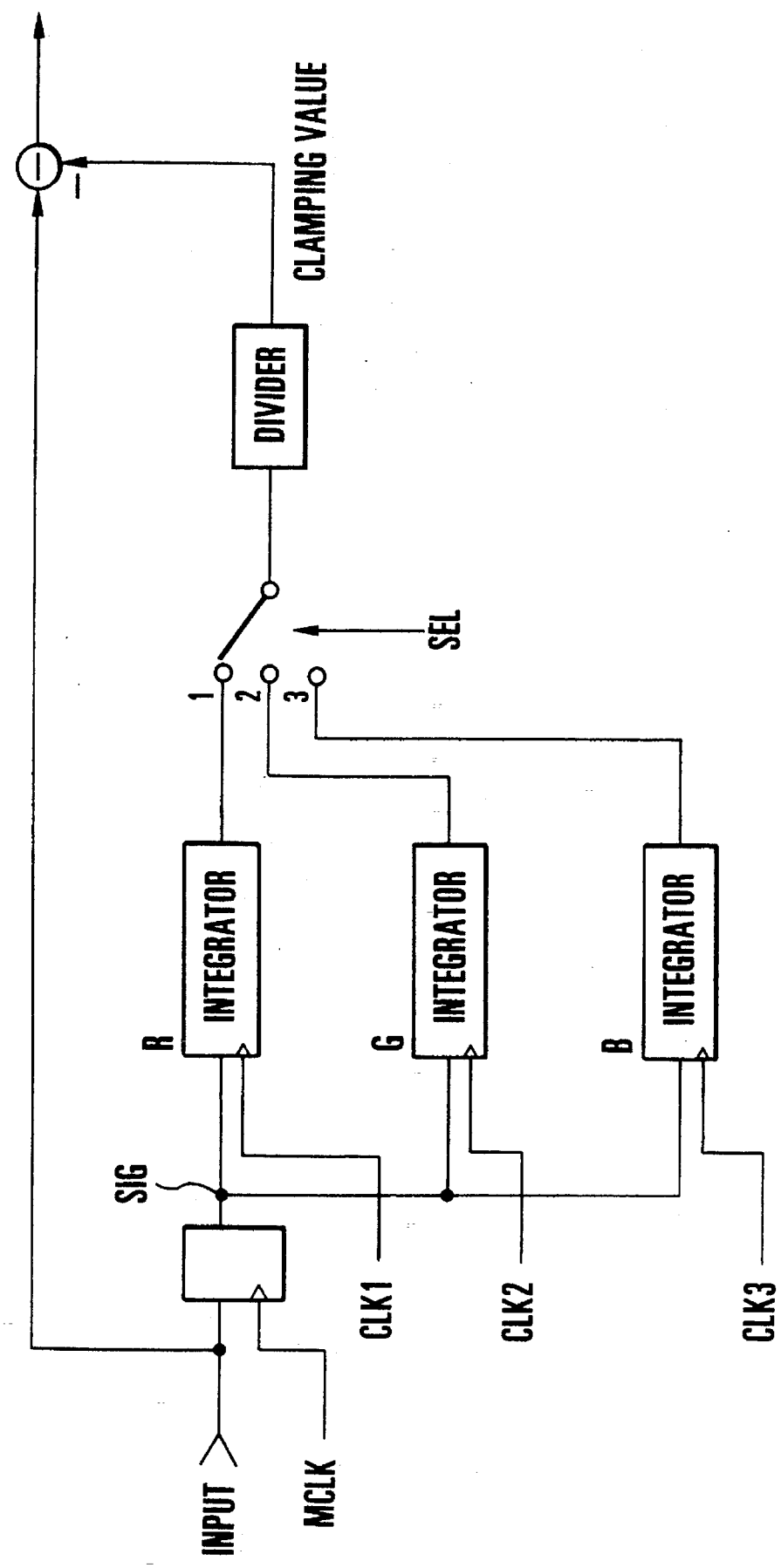
FIG. 1 is a circuit diagram showing the arrangement of the conventional color clamping circuit.
Figure 2:
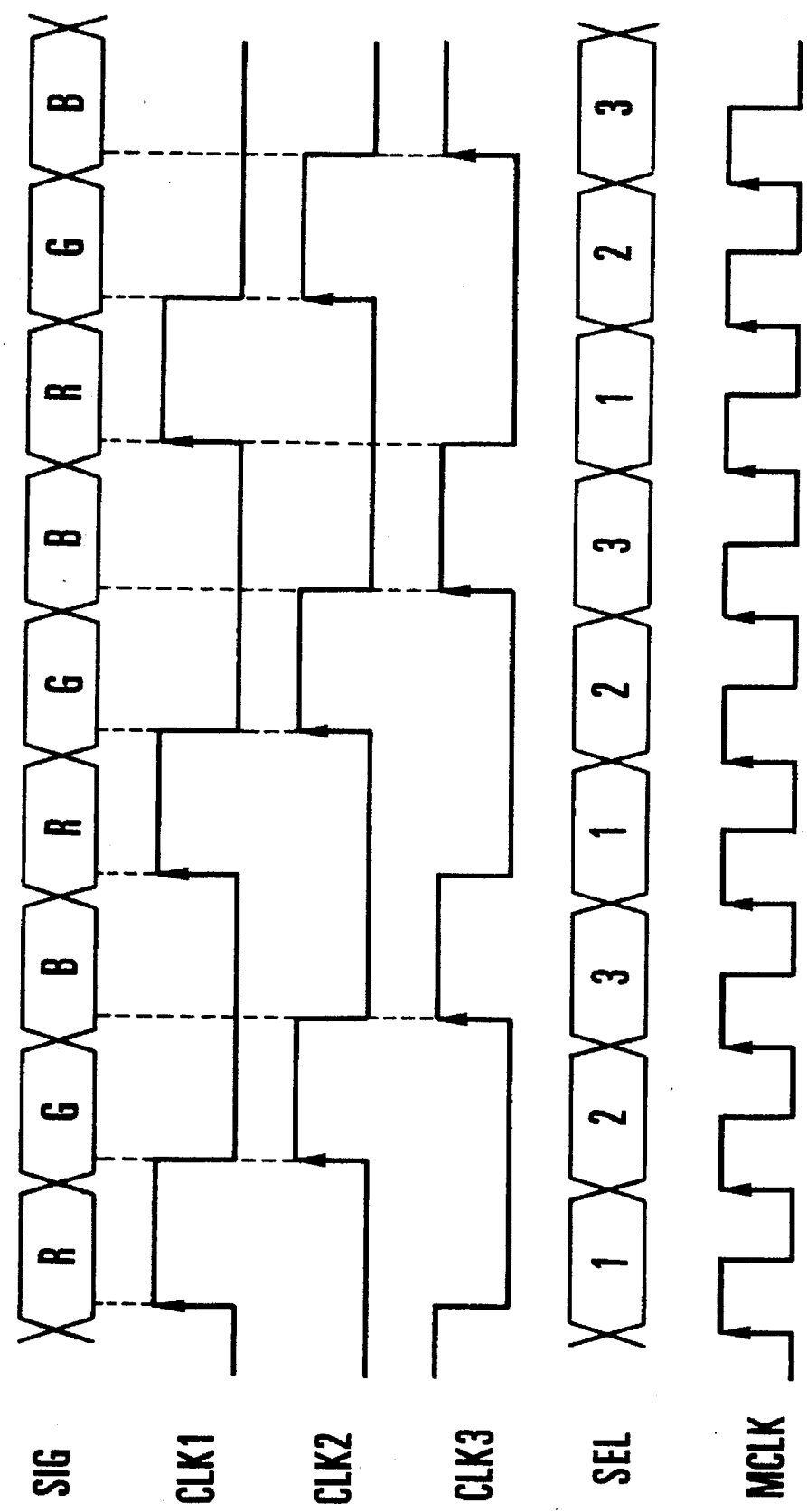
FIG. 2 is a time chart showing a phase relation obtained among signals shown in FIG. 1.
Figure 3:
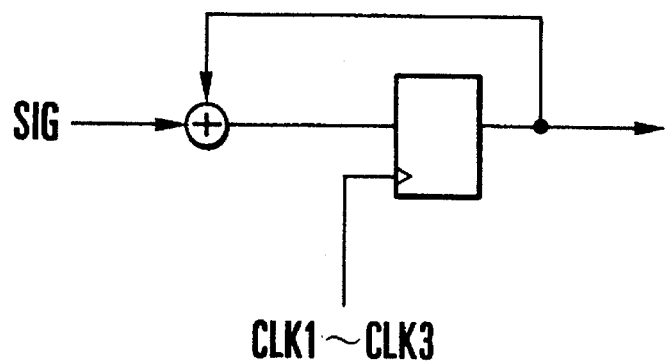
FIG. 3 is a circuit diagram showing the internal arrangement of the conventional integrator.
Figure 4:
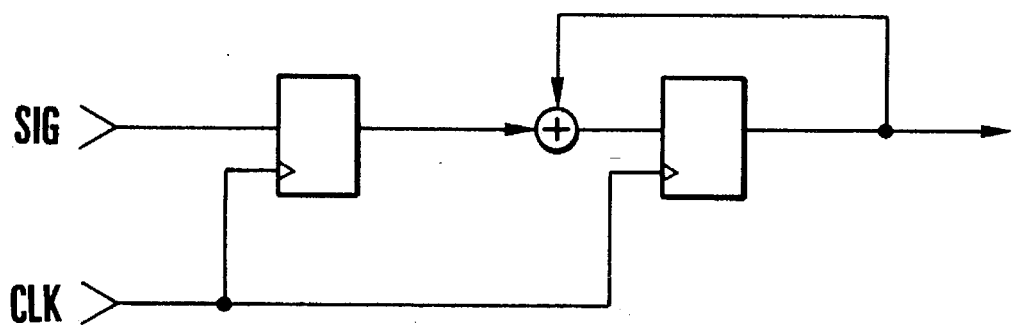
FIG. 4 is a circuit diagram showing one example of the conventional luminance clamping circuit.
Figure 5:
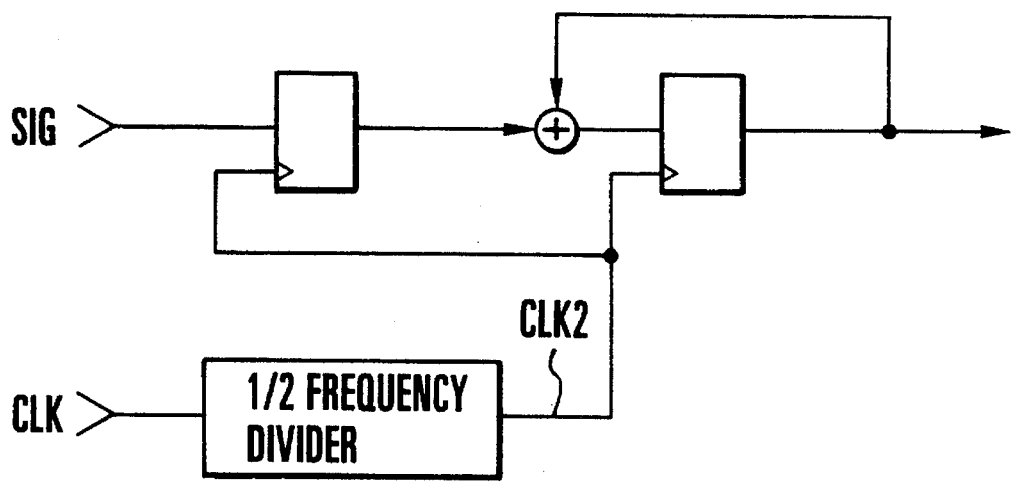
FIG. 5 is a circuit diagram showing another example of the conventional luminance clamping circuit.
Figure 6:
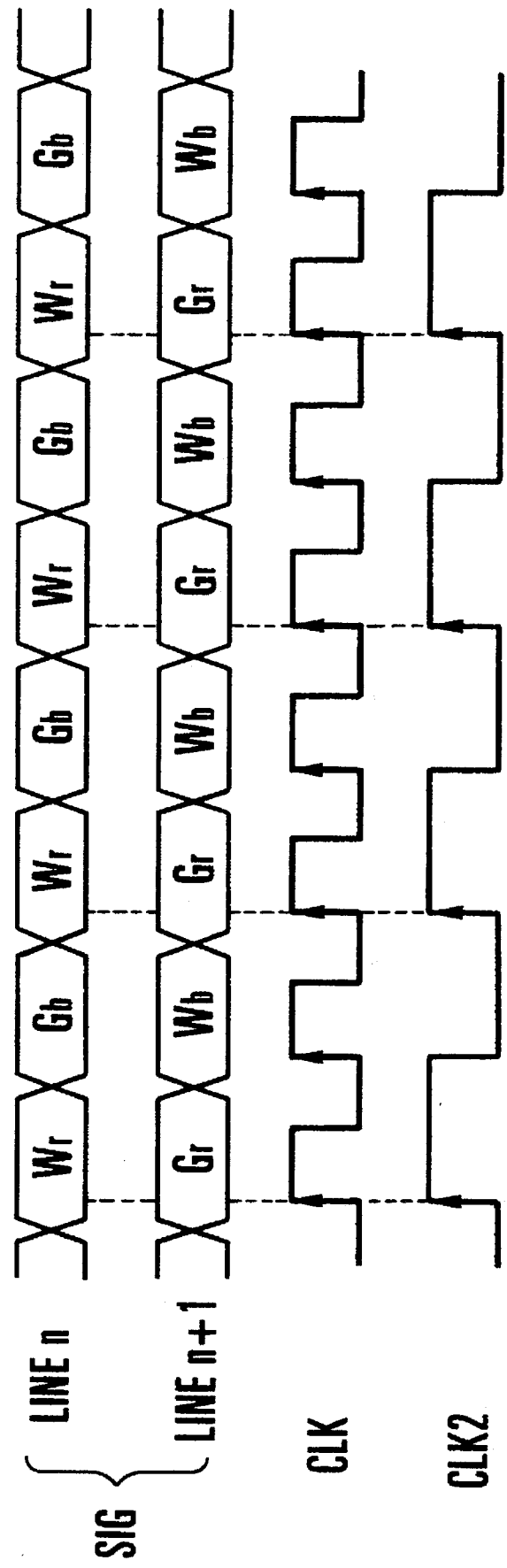
FIG. 6 is a time chart showing a phase relation obtained among signals shown in FIGS. 4 and 5.
Figure 7:
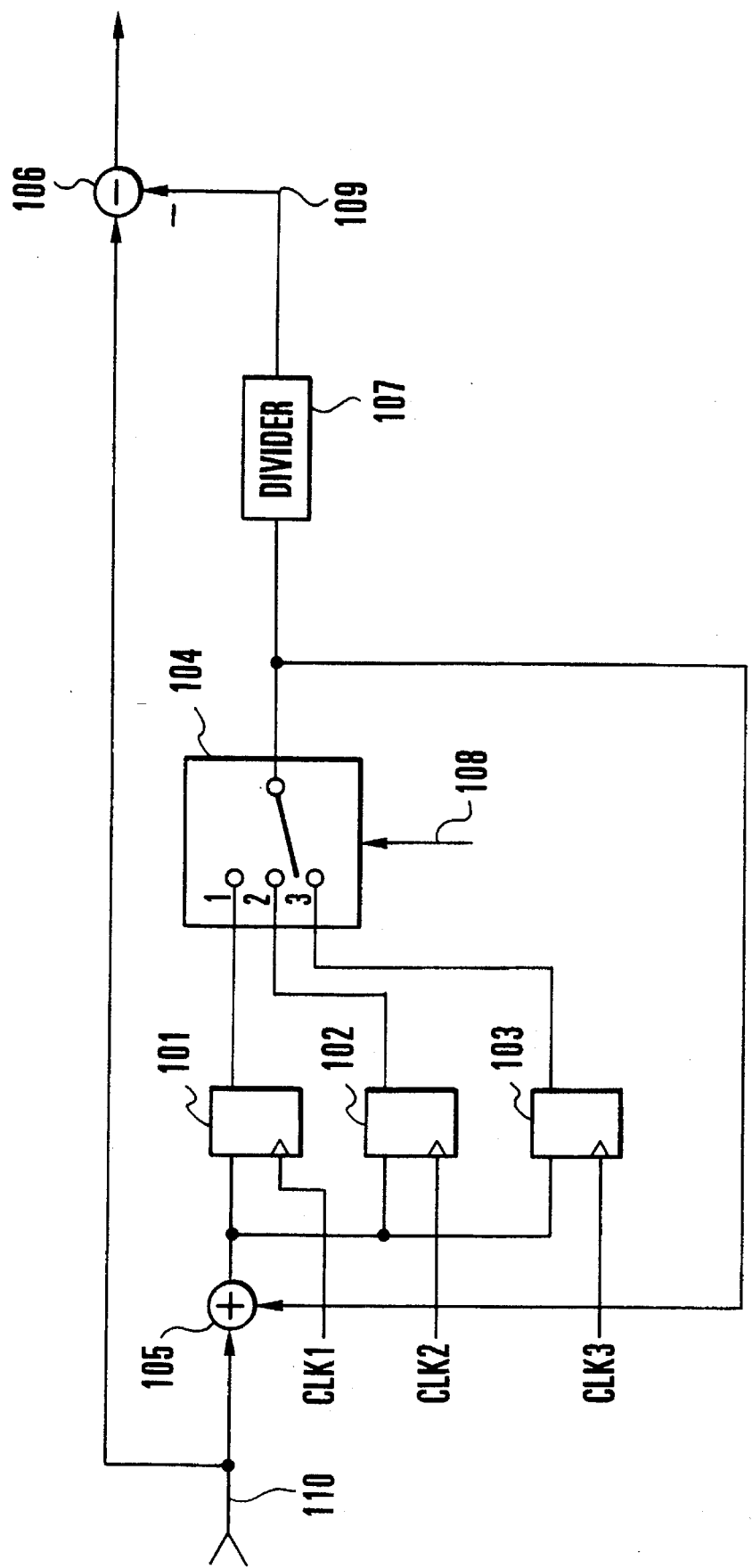
FIG. 7 is a circuit diagram showing an adder included in a color clamping circuit which is arranged as a first embodiment of this invention.
Figure 8:
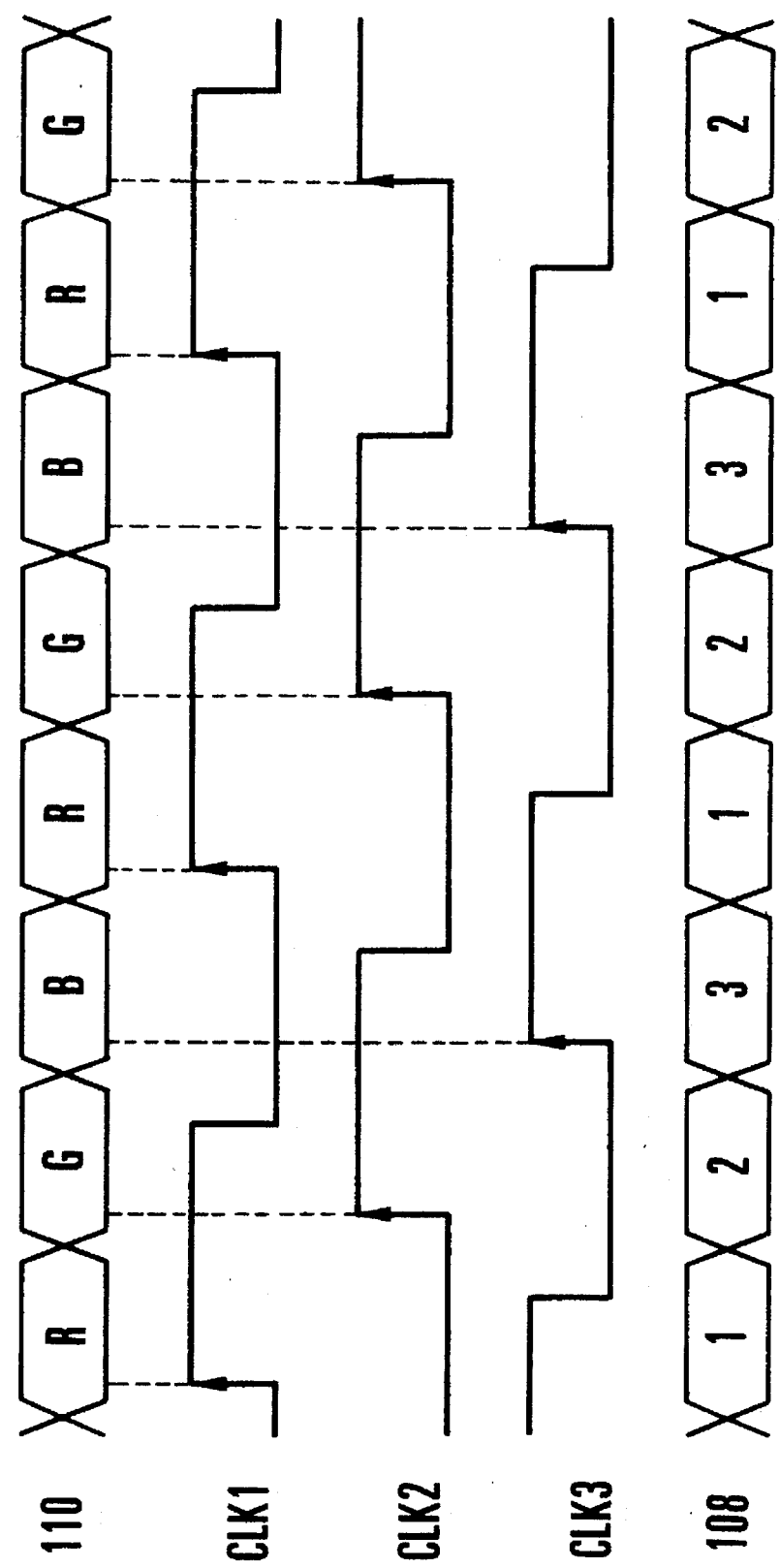
FIG. 8 is a time chart showing a phase relation obtained among signals shown in FIG. 7.

The details of this invention are described below through embodiments thereof:

FIG. 7 is a circuit diagram showing an adder included in a color clamping circuit which is arranged as a first embodiment of this invention. FIG. 8 is a time chart showing a phase relation obtained among signals shown in FIG. 7. The illustration includes delay circuits 101, 102 and 103, a selector 104, an adder 105, a subtracter 106 and a divider 107.

Referring to FIG. 8, an input signal 110 which consists of R, G and B (color) components is continuously received in a dot-sequential manner in the order of R, G and B components. A control signal 108 is arranged to have phases "1", "2" and "3" respectively for the R, G and B components of the input signal 110. The control signal 108 is decided in such a way as to have the phase "1", i.e., the R component, selected by the selector 104 when the input signal 110 is, for example, the R component. If a clock signal CLK1 rises at this moment, the output of the delay circuit 101 is decided. Then, the adder 105 adds the output of the delay circuits 101 to the R component of the input signal 110 to perform an integrating action for the R component.

Next, when the input signal 110 is the G component, the control signal 108 is decided in such a way as to have the phase "2", i.e., the G component, selected by the selector 104. If another clock signal CLK2 rises at that moment, the output of the delay circuit 102 is decided. The adder 105 adds the output of the delay circuit 102 to the G component of the input signal 110 to perform an integrating action for the G component.

When the input signal 110 is the B component, the control signal 108 is decided in such a way as to have the phase "3", i.e., the B component, selected by the selector 104. If a clock signal CLK3 rises at this moment, the output of the delay circuit 103 is decided. The adder 105 then adds the output of the delay circuit 103 to the B component of the input signal 110 to perform an integrating action for the B component.

When the input signal 110 is again the R component, the above-stated processes are repeated to have the output of the delay circuit 101 added to the R component of the input signal 110 to further carry on the integrating action. When the integrating action is carried on for a predetermined period of time, such as one field period, a mean value of the integrated values is obtained by a computing operation performed at the divider 107. The mean value is thus obtained as a clamping value 109. Clamping is applied to the input signal 110 by subtracting the clamping value 109 from the input signal 110 at the subtracter 106.

Figure 9:
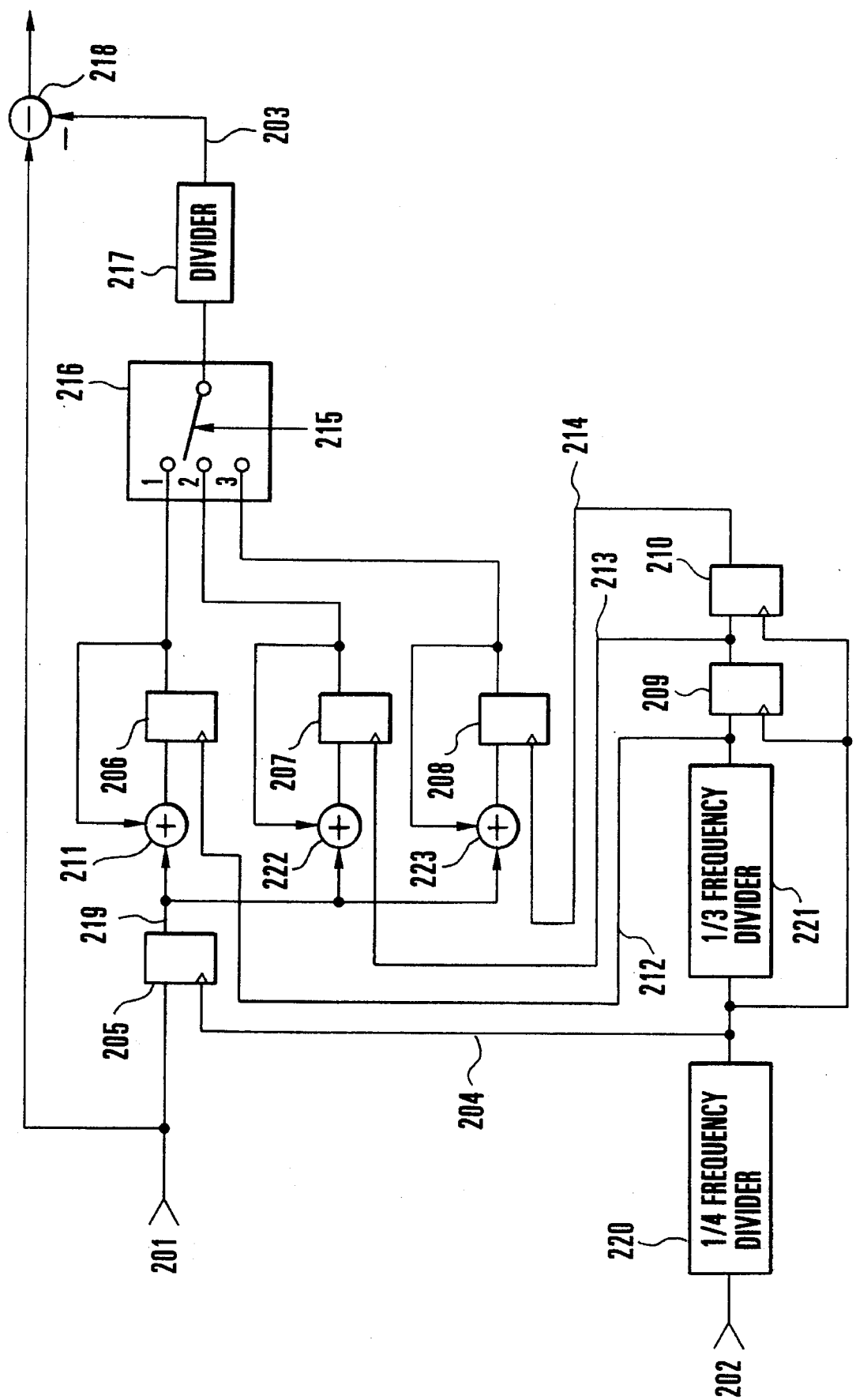
FIG. 9 is a circuit diagram showing a color clamping circuit which is arranged according to this invention as a second embodiment thereof.
Figure 10:
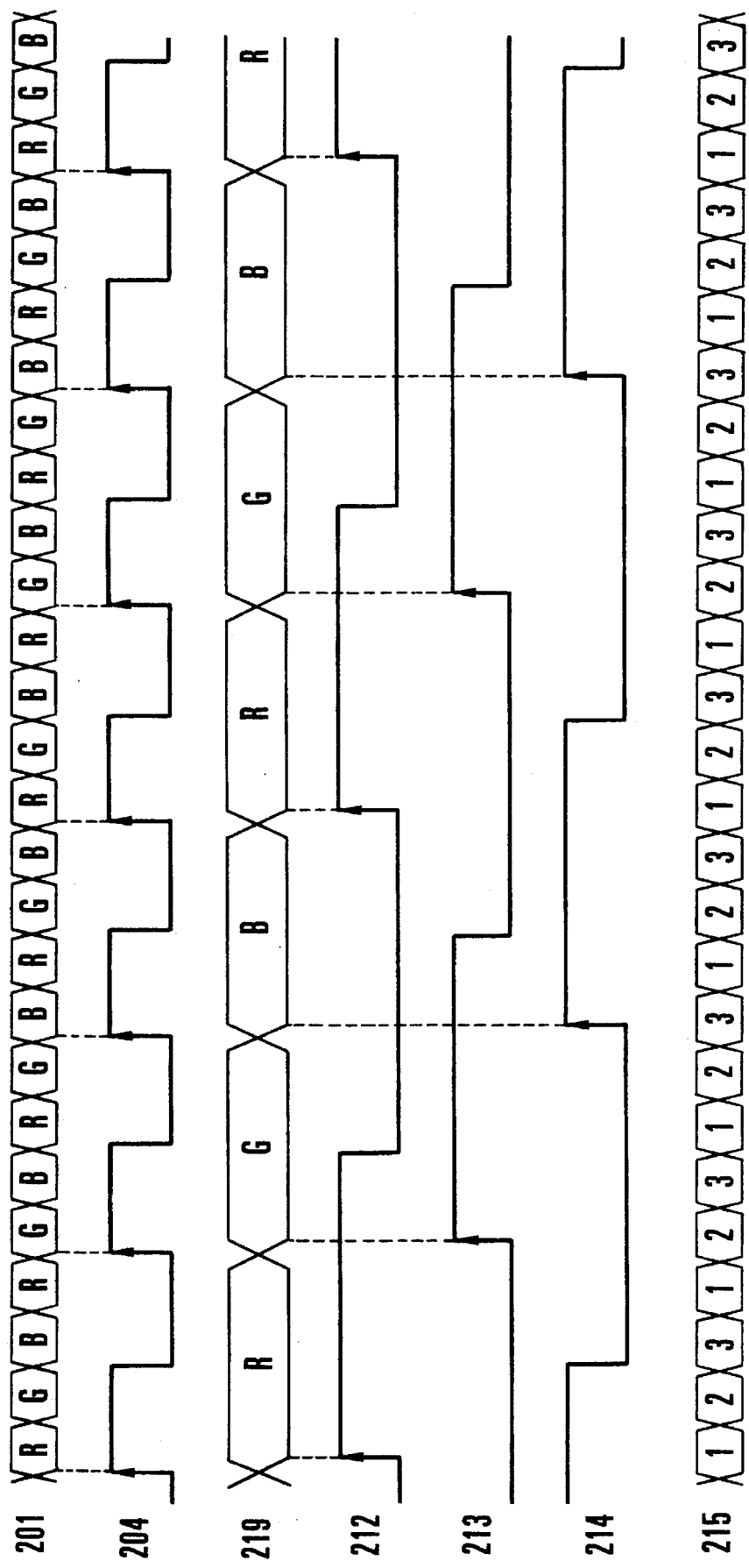
FIG. 10 is a time chart showing a phase relation obtained among signals shown in FIG. 9.

FIG. 9 is a circuit diagram showing a color clamping circuit which is arranged according to this invention as a second embodiment thereof. FIG. 10 is a time chart showing a phase relation obtained among signals shown in FIG. 9. As shown in FIG. 10, an input signal 201 consisting of R, G and B components is received in a dot-sequential manner. A main clock signal 202 of the system is frequency-divided by four through a ¼ frequency divider 220 into a clock signal 204 (see FIG. 10). The R, G and B components of the input signal 201 are latched one after another by a delay circuit 205 in accordance with the clock signal 204. With the input signal 201 latched by the delay circuit 205 in accordance with the clock signal 204, the output of the delay circuit 205 becomes a signal 219 which is as shown in FIG. 10. The clock signal 204 is further frequency-divided by three through a ⅓ frequency divider 221 to become a clock signal 212 as shown in FIG. 10. The clock signal 212 is delayed by delay circuits 209 and 210 to become clock signals 213 and 214.

When, for example, the output 219 of the delay circuit 205 is the R component, the control signal 215 is decided to have its phase "1" for the R component selected by the selector 216. At this time, the output of the delay circuit 206, i.e., the result of integration obtained up to this point of time, is decided by a rise of the clock signal 212. The output of the delay circuit 206 is then added to the R component by an adder 211. The R component exists in the output 219 of the delay circuit 205 until the clock signal 204 rises next time. The adding action of the adder 211 is, therefore, performed during one clock period of the clock signal 204. This arrangement gives a length of time which is four times as long as the conventionally available length of time for the computing action. Therefore, any faulty action can be avoided during the process of integration. After that, the mean value, i.e., a clamping value 203, of integrated values obtained during a predetermined period of time (such as one field period) is obtained by a divider 217. Clamping is applied to the input signal 201 by subtracting the clamping value 203 from the input signal 201 at a subtracter 218.

Figure 11:
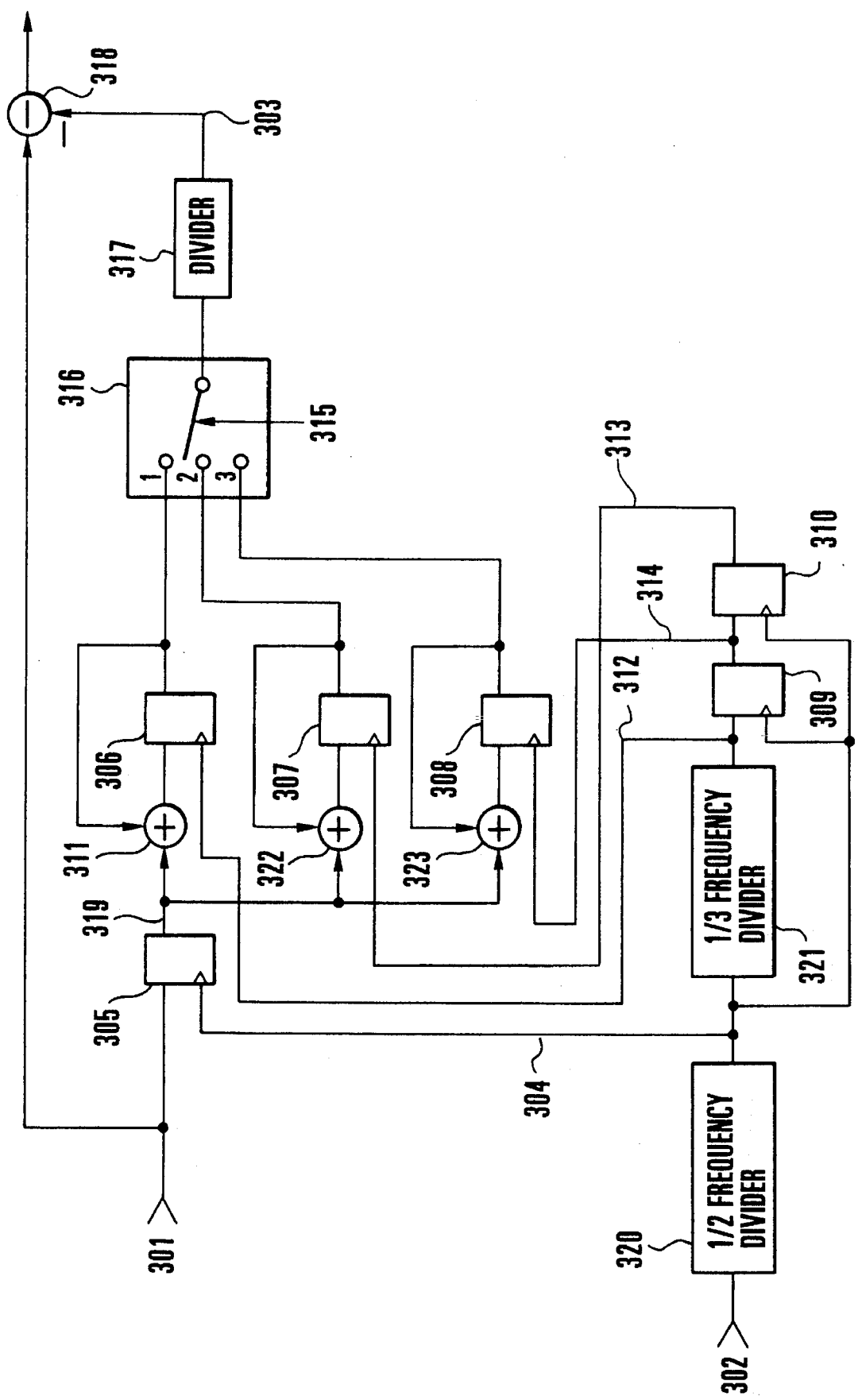
FIG. 11 is a circuit diagram showing a color clamping circuit which is arranged according to this invention as a third embodiment thereof.
Figure 12:
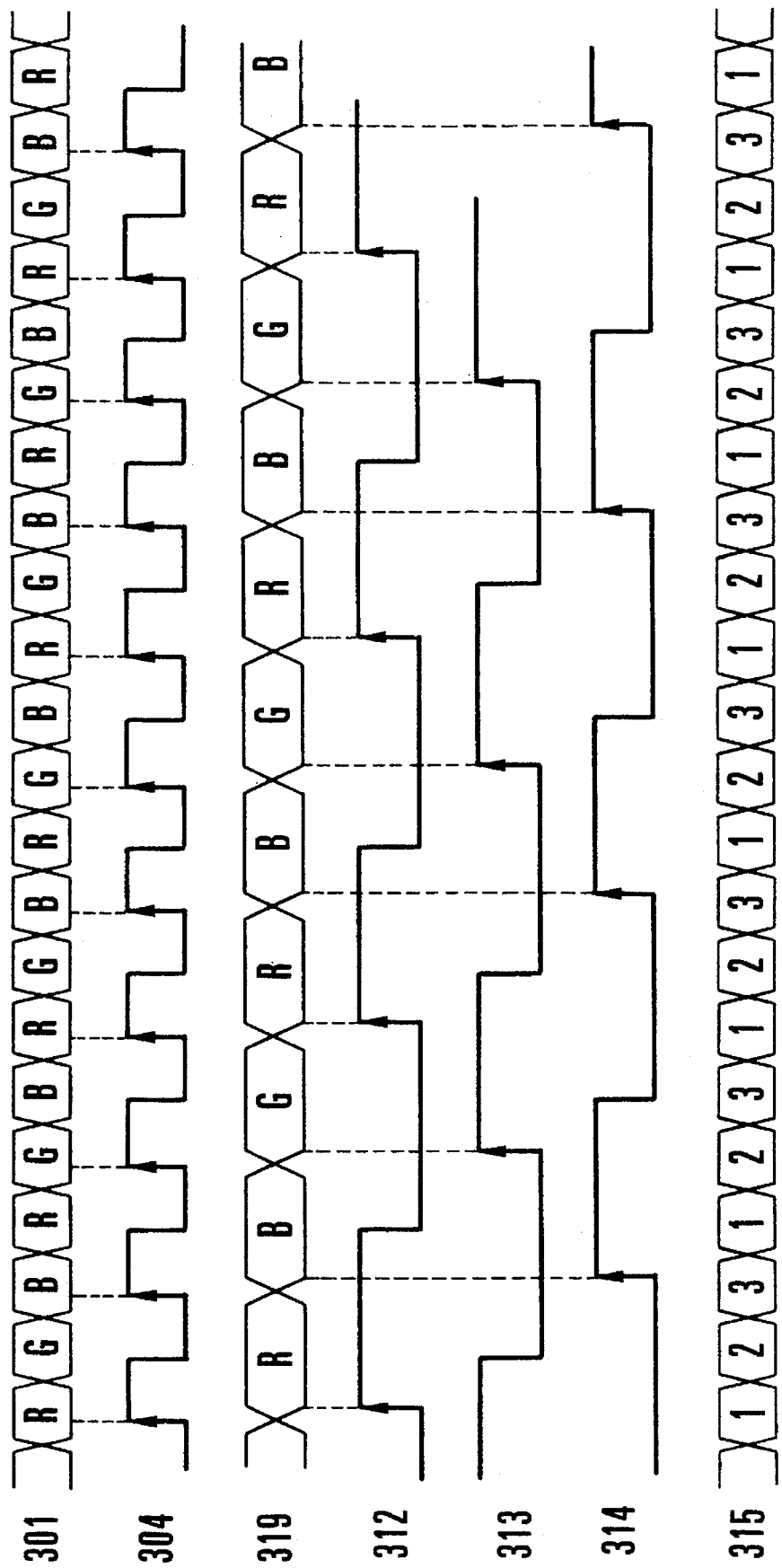
FIG. 12 is a time chart showing a phase relation obtained among signals shown in FIG. 11.

FIG. 11 is a circuit diagram showing a color clamping circuit which is arranged as a third embodiment of this invention. FIG. 12 is a time chart showing a phase relation obtained among signals shown in FIG. 11. An input signal 301 is received including R, G and B color components in a dot-sequential manner as shown in FIG. 12. A main clock signal 302 of the system of the third embodiment is frequency-divided by two at a ½ frequency divider 320 into a clock signal 304 as shown in FIG. 12. The input signal 301 is latched by a delay circuit 305 according to the clock signal 304. The output of the delay circuit 305 becomes a signal 319 as shown in FIG. 12. The clock signal 304 is further frequency-divided by three at a ⅓ frequency divider 321 to become a clock signal 312 as shown in FIG. 12. The clock signal 312 is delayed through delay circuits 309 and 310 to become clock signals 314 and 313.

When, for example, the output 319 of the delay circuit 305 is the R component, a control signal 315 is decided in such a way as to have the phase "1", for the R component, of the control signal 315 selected by a selector 316. At this moment, the output of the delay circuit 306, i.e., the result of integration up to this point of time, is decided by a rise of the clock signal 312. An adder 311 then adds two R component parts together. Since the R component exists in the output 319 of the delay circuit 305 until a next rise of the clock signal 304, the adding action of the adder 311 is performed within one clock period of the clock signal 304. The one clock period gives a length of time which is twice as long as the length of time conventionally available for the computing action. Any faulty action thus can be avoided during the process of integration. After that, a mean value of integrated values obtained during a predetermined period of time, such as one field period, is computed as a clamping value 303 by a divider 317. Clamping is then applied to the input signal 301 by subtracting the clamping value 303 from the input signal 301 at a subtracter 318.

In the case of the third embodiment, the G and B components appear in the output 319 in an order reverse to the order obtained in the case of the second embodiment. Therefore, attention must be given to the phase relation between the clock signals 313 and 314 which are respectively inputted to the delay circuits 307 and 308.

Figure 13:
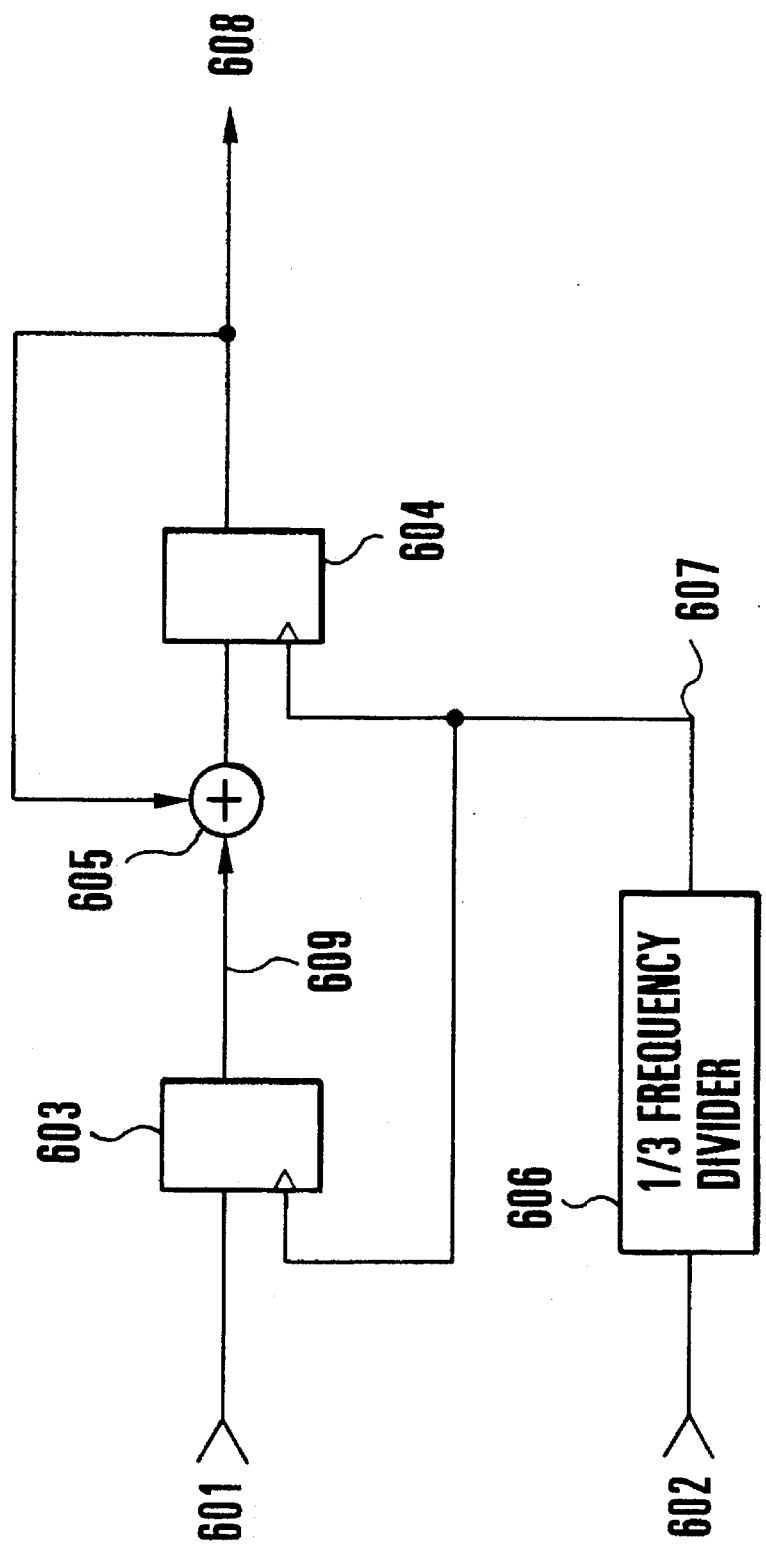
FIG. 13 is a circuit diagram showing a luminance clamping circuit which is arranged according to this invention as a fourth embodiment thereof.
Figure 14:
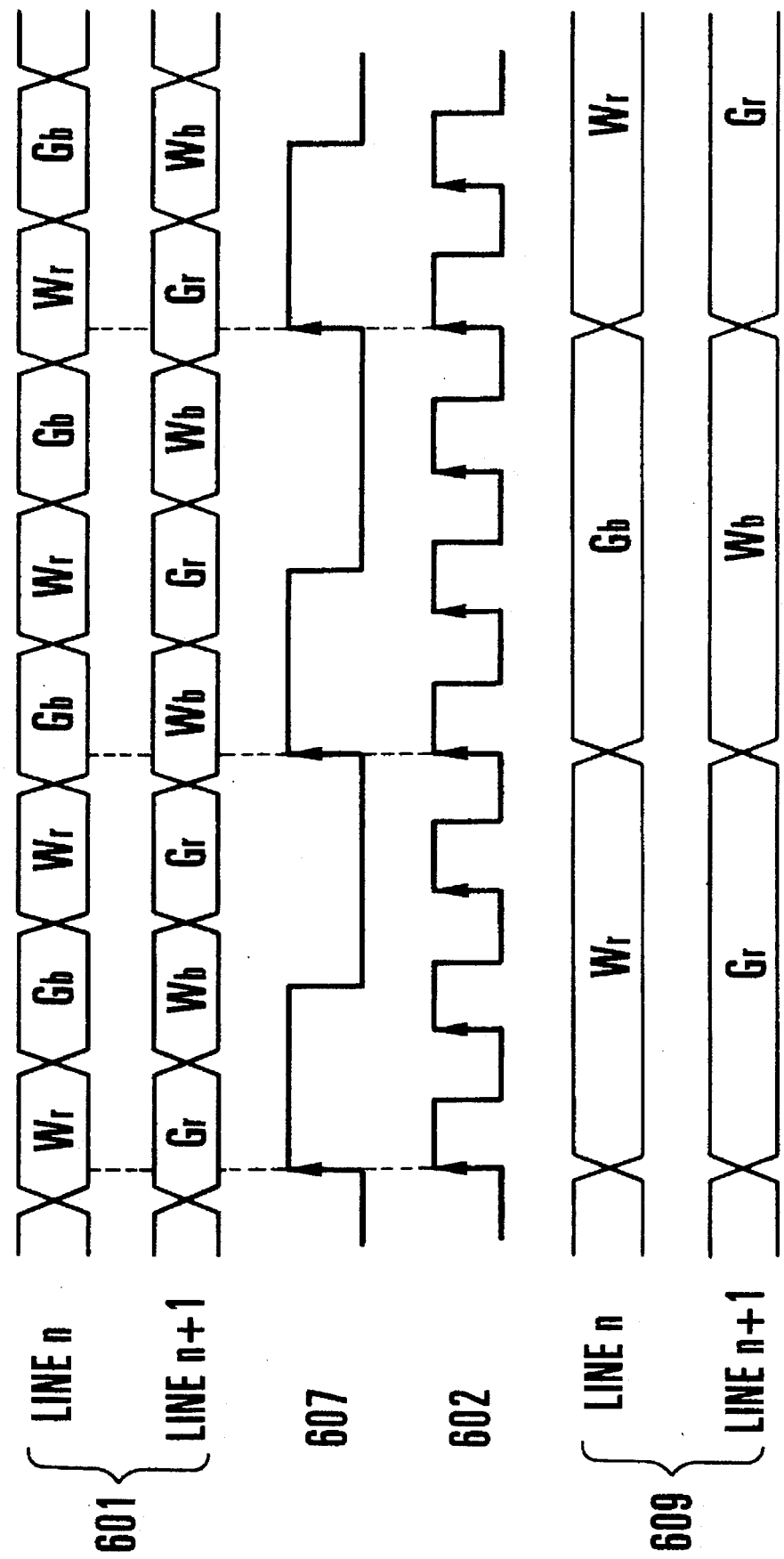
FIG. 14 is a time chart showing a phase relation obtained among signals shown in FIG. 13.

FIG. 13 is a circuit diagram showing a luminance clamping circuit which is arranged according to this invention as a fourth embodiment thereof. FIG. 14 is a time chart showing a phase relation obtained among signals shown in FIG. 13. As shown in FIG. 14, an input signal 601 alternately has its Wr and Gb components in one line n and its Gr and Wb components in another line n+1. A main clock signal 602 of the system of the third embodiment is frequency-divided into a clock signal 607 by a ⅓ frequency divider 606 as shown in FIG. 14. The input signal 601 is latched at a delay circuit 603 in accordance with the clock signal 607. The output of the delay circuit 603 becomes a signal 609 as shown in FIG. 14.

Assuming that the output 609 of the delay circuit 603 is caused to have the Wr component of the line n at a rise of the clock signal 607, the data of the Wr component is added by an adder 605 to the result of integration obtained up to then. When the clock signal 607 rises next time, the Gb component exists in the input signal 601 as shown in FIG. 14. Therefore, the adder 605 is allowed to perform an adding action on the different component. The adding action is performed within one clock period of the clock signal 607. The length of time thus provided for the adding action is three times as long as the conventionally available length of time. Any faulty action thus can be avoided during the process of mintegration.

In the fourth embodiment, the main clock signal is arranged, for example, to be frequency-divided by three. Generally, however, by inputting a clock signal obtained by frequency-dividing the main clock signal by any odd number to a delay circuit disposed before or after an adder, an adding action can be accomplished on each of different components existing in each of lines. A fifth embodiment of this invention represents one example of such arrangement.

Figure 15:
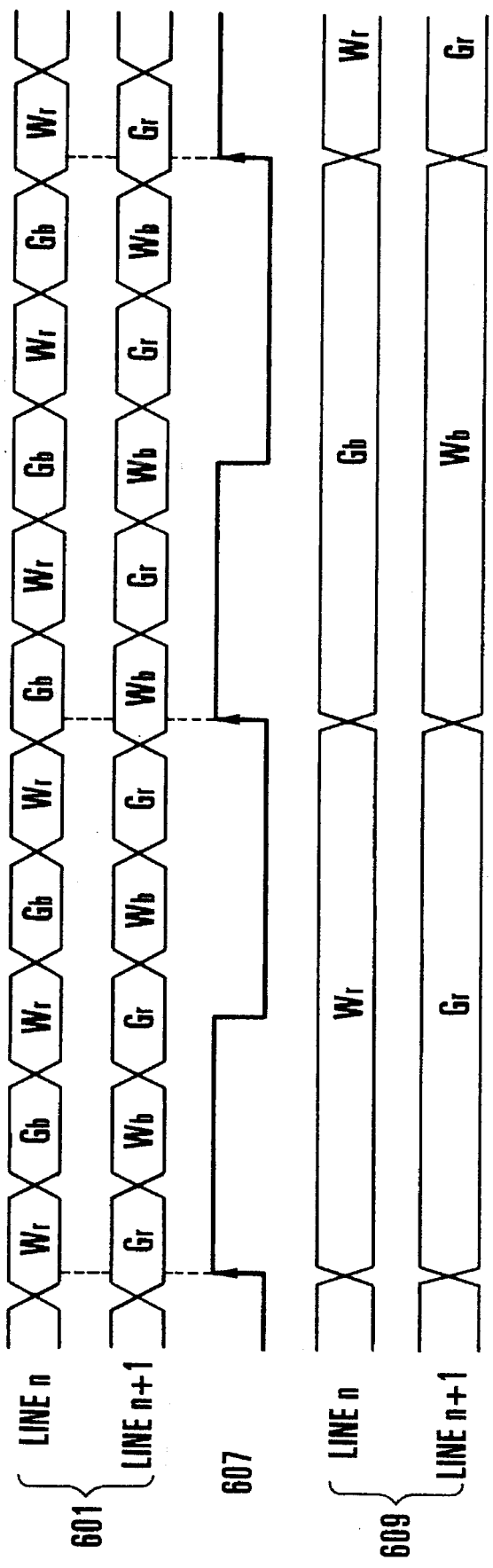
FIG. 15 is a time chart showing a phase relation obtained among signals by using a clock signal obtained by dividing a main clock signal by five in a luminance clamping circuit which is arranged as a fifth embodiment of this invention.

The fifth embodiment is as shown in FIG. 15. FIG. 15 is a time chart showing a phase relation obtained among signals with a main clock signal frequency-divided by five. In this case, the ⅓ frequency divider 606 of FIG. 13 is replaced with a ⅕ frequency divider. As shown in FIG. 15, the use of the clock signal obtained by frequency-dividing the main clock signal by five gives a length of computing time which is five times as long as the conventionally available length of computing time.

In each of the color clamping circuits arranged according to this invention to clamp the R, G and B color components of an input signal in a dot-sequential manner as described in the foregoing, one and the same adder is arranged to be used in a time sharing manner for computing clamping values for the R, G and B components, so that the amount of hardware can be greatly reduced.

Further, in each of the color clamping circuits arranged according to this invention to clamp the R, G and B components in a dot-sequential manner, the clock signals to be used for the integrators are arranged to have lower frequencies than the frequency of the main clock signal of the system. This arrangement ensures that the adding action can be reliably carried out and that any faulty clamping action can be avoided.

In the luminance clamping circuits arranged according to this invention to clamp an input signal having the Gb, Wb and Gr components as described above, clock signals obtained by frequency-dividing the main clock signal of the system by odd numbers are used for integrators. That arrangement ensures that the adding action can be reliably carried out and the components can be evenly integrated.

Meanwhile, the conventional color clamping circuit has been provided with no means for monitoring the signal after clamping. Therefore, it has been hardly possible to obtain an accurate OB (optical black) level, because it has been practiced to adjust the level of clamping without monitoring.

To solve this problem, a sixth embodiment of this invention is arranged such that a color signal is first temporarily clamped by giving an offset value, the processes of white balance adjustment and gamma correction are carried out on the temporarily clamped color signal, a color-difference signal is formed from the color signal thus processed and, after that, the vector of this color-difference signal is adjusted. This arrangement enables the sixth embodiment to correctly carry out a clamping action through the offset value adjustment made by monitoring the color-difference signal.

Figure 16:
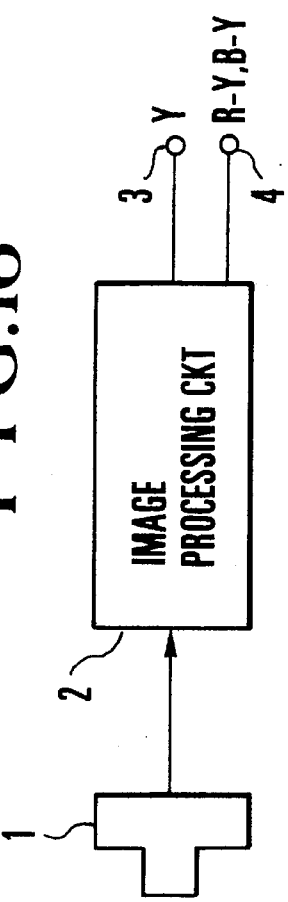
FIG. 16 is a block diagram showing in outline the arrangement of a video camera which is arranged as a sixth embodiment of this invention.

The details of the sixth embodiment are described as follows: FIG. 16 shows in outline the arrangement of a video camera which is arranged as the sixth embodiment of this invention. Referring to FIG. 16, an image sensor 1 is composed of a CCD or the like. An image processing circuit 2 is arranged to A/D (analog-to-digital) convert the output signal of the image sensor 1, to perform predetermined processes on the A/D converted signal and to output a luminance signal Y to an output terminal 3 and color-difference signals R-Y and B-Y to another output terminal 4.

Figure 17:
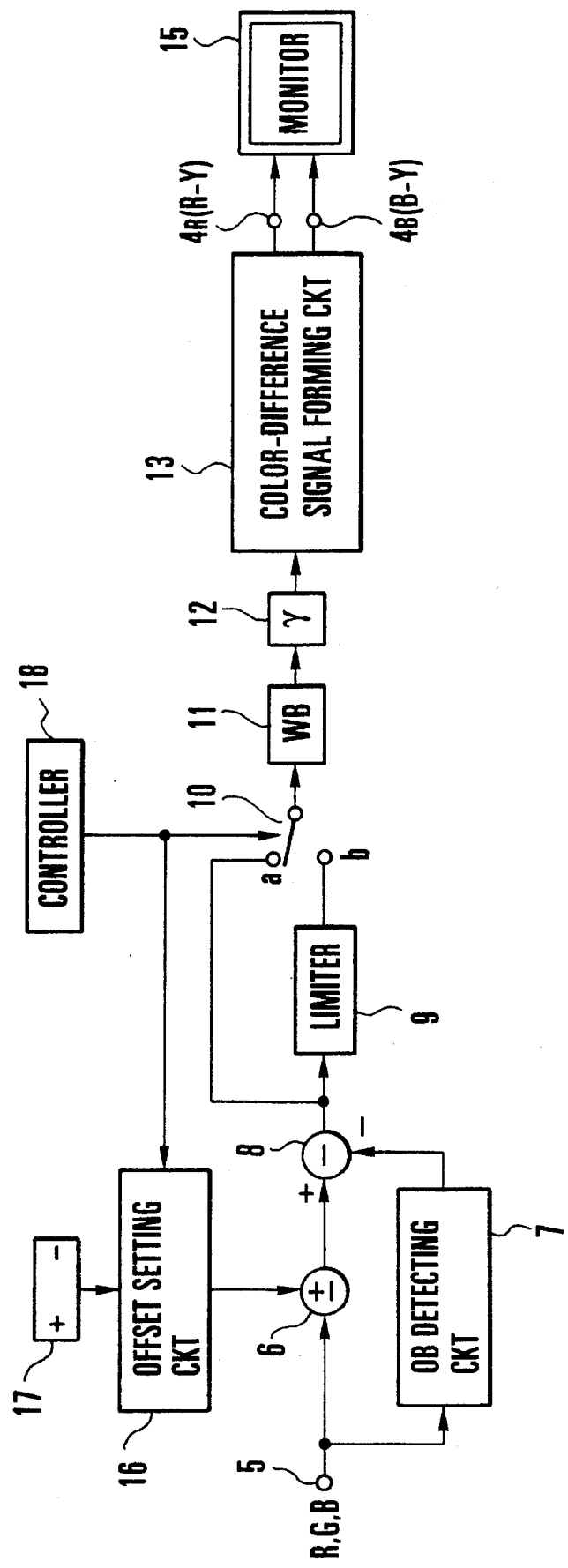
FIG. 17 is a block diagram showing in detail the internal arrangement of an image processing circuit shown in FIG. 16.

FIG. 17 shows a part of the image signal processing circuit 2 of FIG. 16 related to a color clamping circuit. Referring to FIG. 17, an input terminal 5 is arranged to receive a dot-sequential color signal consisting of R, G and B (color) components. An adder-subtracter 6 is arranged to add an offset value to the color signal. An OB detecting circuit 7 is arranged to detect a mean value of OB (optical black) levels obtained during a predetermined period of the color signal. A subtracter 8 is arranged to subtract the level detected by the OB detecting circuit 7 from the output signal of the adder-subtracter 6. A limiter 9 is arranged to clip the output signal of the subtracter 8 to a zero level. A switch 10 is arranged to perform switching between the output signal of the subtracter 8 and that of the limiter 9. The offset value mentioned above is set by an offset setting circuit 16. The offset setting circuit 16 is arranged to permit setting of the offset value at a desired value by operating an operation part 17. A controller 18 is arranged to on-off control the offset setting circuit 16. The on-off control over the offset setting circuit 16 is performed by turning on and off the switch 10 for adjustment.

A white balance adjustment circuit 11 is arranged to adjust the white balance of the signal selected by the switch 10. A correction circuit 12 is arranged to perform nonlinear processes such as a gamma correction process, etc., on the white-balance-adjusted signal. A color-difference signal forming circuit 13 is arranged to form color-difference signals R-Y and B-Y from the color signal after the white balance adjustment and the gamma correction. Output terminals 4R and 4B are arranged to output respectively the color-difference signals R-Y and B-Y.

The operation of the sixth embodiment arranged in the manner described above is as follows: a color signal inputted to the input terminal 5 is supplied to the adder-subtracter 6 to have an offset value added to or subtracted from the input color signal. After that, the color signal is applied to the subtracter 8. The input color signal is also supplied from the input terminal 5 to the OB detecting circuit 7. At the OB detecting circuit 7, the mean value of the OB levels is detected. The mean OB value is supplied to the subtracter 8. At the subtracter 8, the mean OB value is subtracted from the color signal to which the above-stated offset value has been applied. The subtraction is made in such a way as to make the OB level value of the output of the subtracter 8 zero.

Figure 18:
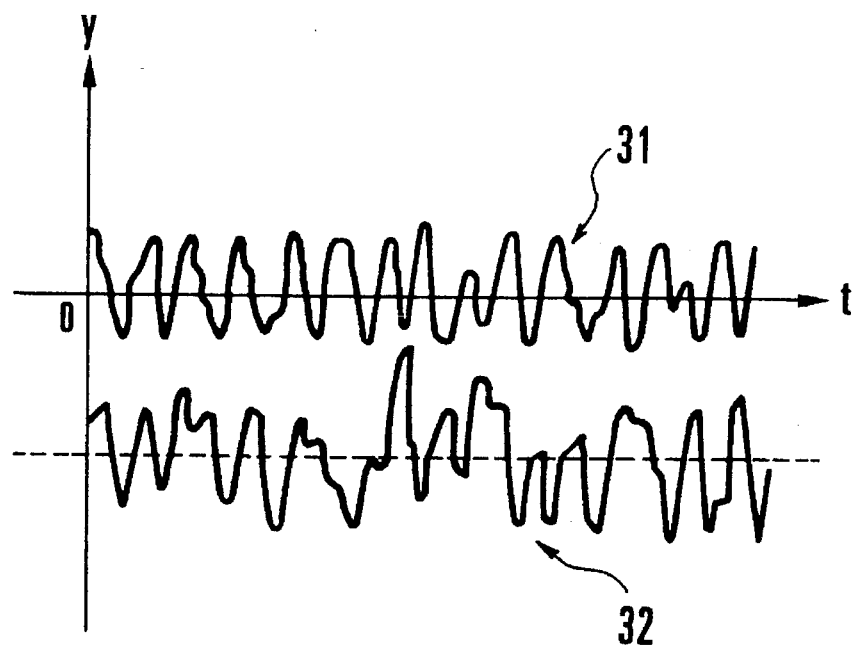
FIG. 18 shows the waveform of a color signal.

However, in some cases where a noise, a carrier, etc., have been superimposed on the input color signal, the subtraction output of the subtractor 8 fails to have the OB level value at zero as represented by a signal 32 shown in FIG. 18, which shows the output of the subtracter 8. In such a case, the OB value is caused to become zero, as reprsented by a signal 31 in FIG. 18, by adjusting the offset value mentioned above.

To confirm that the above-stated OB value becomes zero as desired, a confirming action is performed in the following manner: the switch 10 is connected to its one contact "a" to select the above-stated subtraction output. The subtraction output is applied to the white balance adjustment circuit 11 and the correction circuit 12 one after another. A signal obtained through the white balance adjustment and the gamma correction is applied to the color-difference forming circuit 13. The color-difference signals R-Y and B-Y thus obtained respectively at the output terminals 4R and 4B are displayed on a vector-scope of a monitor 15, as shown in FIG. 19.

Figure 19:
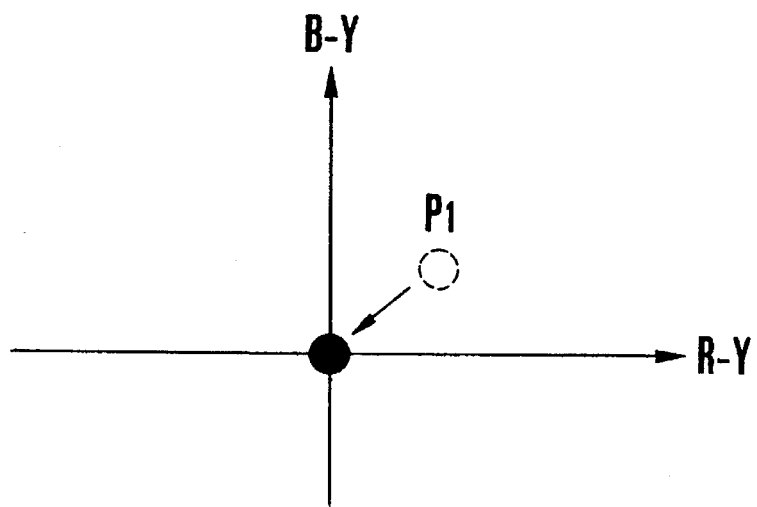
FIG. 19 shows the coordinates of a color-difference vector obtained on a monitor.

FIG. 19 shows the coordinates of a color-difference vector. The offset value is adjusted by operating the operation part 17, while monitoring the color-difference vector, in such a way as to bring the color-difference vector from a position P1 to an origin on the vector-scope. A clamping action thus can be accurately accomplished to make the OB level zero.

After completion of the adjustment, the switch 10 is normally connected to another contact "b" thereof to select the output of the limiter 9. The gamma correction cannot be accurately carried out if the input color signal has a negative level. The embodiment is, therefore, arranged to normally clip the negative level to a zero level by means of the limiter 9.

If the output signal of the limiter 9 is selected by the switch 10 during the process of offset adjustment, the OB level which is in process of being adjusted would be brought to zero by the limiter 9. In such a case, the offset adjustment becomes hardly possible even by using the color-difference signal vector. To avoid this trouble, the embodiment is arranged not to use the limiter 9 through the switch 10 during the process of offset adjustment.

The sixth embodiment is arranged, as described above, to turn on and off the limiter and to make the offset adjustment while monitoring the color-difference signals on the vector-scope of the monitor. The arrangement thus facilitates the offset adjustment and enables the embodiment to accurately carry out the clamping action.

What is claimed is:

1. A level control circuit comprising:
    a) level control means for controlling the level of a predetermined part of an input signal, said level control means including an offset adjusting arithmetic circuit which is arranged to add or subtract a predetermined level value to or from said input signal, said predetermined part including an optical black part of the input signal;
    b) limiter means for limiting an output signal of said level control means;
    c) setting means for setting a control amount of the level control means;
    d) switch means for selectively outputting an output of the level control means or an output of the limiter means; and
    e) control means for controlling the setting means and the switch means in association with each other, said control means controlling the switch means in such a manner that the output of the level control means is outputted during the setting operation of the setting means.

2. A circuit according to claim 1, further comprising monitor means for displaying an output signal of said limiter means.

3. A circuit according to claim 2, wherein said monitor means includes a vector-scope.

4. A circuit according to claim 2, further comprising a nonlinear circuit arranged in a front stage of said monitor means to nonlinearly process the output signal of said limiter means.

5. A level control circuit comprising:
a) level control means for controlling the level of a predetermined part of an input signal, said predetermined part includes an optical black signal of the input signal;
b) limiter means for limiting an output signal of said level control means;
c) setting means for setting a control amount of the level control means;
d) switch means for selectively outputting an output of the level control means or an output of the limiter means; and
e) control means for controlling the setting means and the switch means in association with each other, said control means controlling the switch means in such a manner that the output of the level control means is outputted during the setting operation of the setting means.

6. A circuit according to claim 5, wherein said level control means includes an offset adjusting arithmetic circuit which is arranged to add or subtract a predetermined level value to or from said input signal.

7. A level control apparatus, comprising:
(a) level control means for controlling the level of a predetermined part of an input signal, said predetermined part includes a signal corresponding to a black level;
(b) limiter means for limiting an output signal of said level control means;
(c) setting means for setting a control amount of the level control means;
(d) switch means for selectively outputting an output of the level control means or an output of the limiter means, said switch means outputting the output signal of the level control means during the setting operation by the setting means; and
(e) signal processing means for performing a predetermined process to the output signal of the switch means.

8. An apparatus according to claim 7, wherein the signal processing means includes white balance control means.

9. An apparatus according to claim 7, wherein the signal processing means includes correction means.

* * * * *

UNITED STATES PATENT AND TRADEMARK OFFICE
CERTIFICATE OF CORRECTION

PATENT NO. : 5,548,331

DATED : August 20, 1996

INVENTOR(S): Norihiro Kawahara, et al.

It is certified that error appears in the above-identified patent and that said Letters Patent is hereby corrected as shown below:

On the title page, Item [57], ABSTRACT, delete lines 9-12.

Col. 1, lines 7-8, change "lumi-narice" to -- luminance --.

Col. 2, line 55, change "in continuous" to -- incontinuous --.

Col. 6, line 19, change "mintegration" to -- integration --.

Signed and Sealed this

Eighteenth Day of March, 1997

Attest:

BRUCE LEHMAN

Attesting Officer  Commissioner of Patents and Trademarks